Feb. 27, 1962 N. KAWABATA 3,022,603
GARDEN WATERFALL DEVICE
Filed Sept. 4, 1959
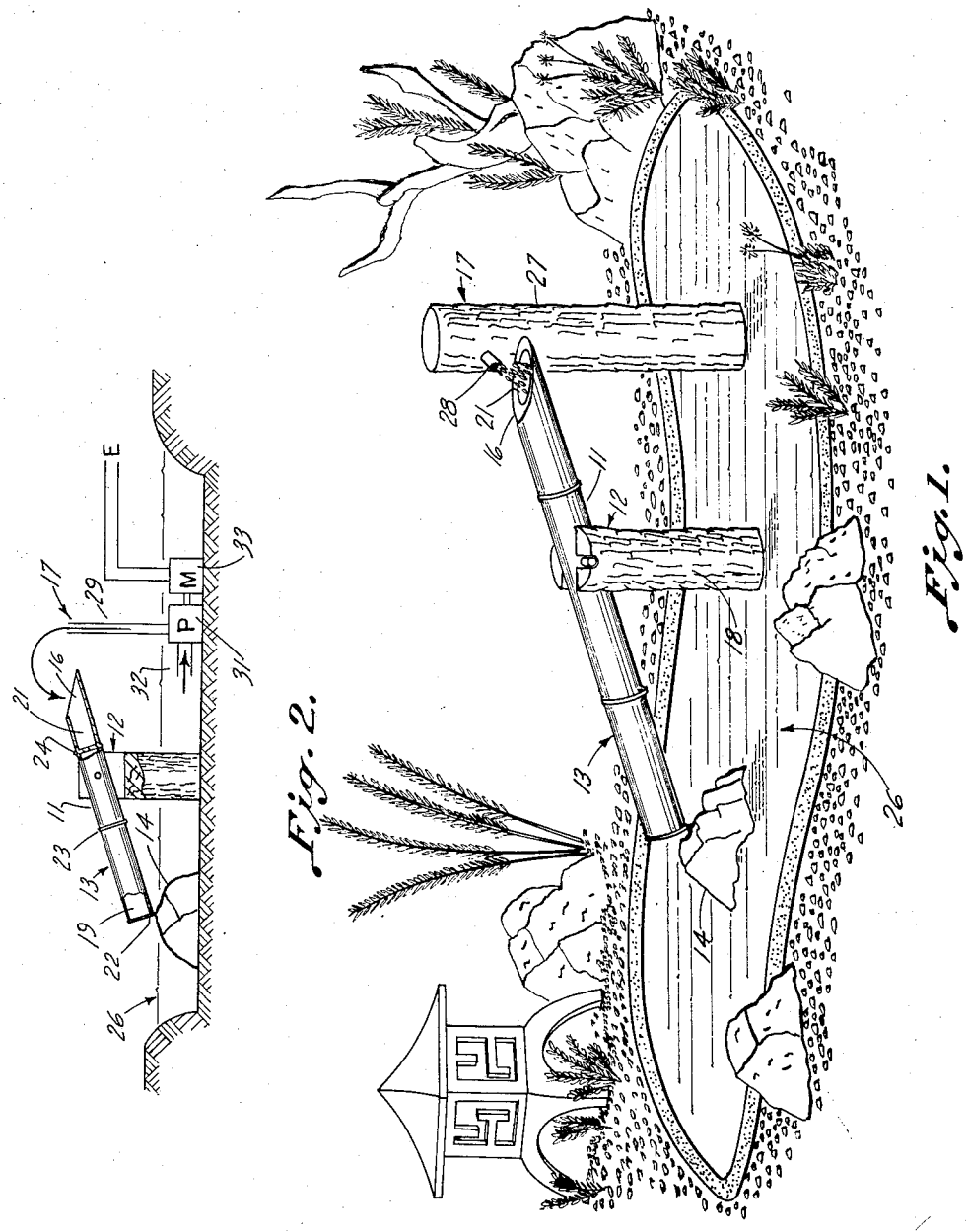
INVENTOR
*NOBUE KAWABATA*
ATTORNEY United States Patent Office 3,022,603
Patented Feb. 27, 1962

3,022,603
GARDEN WATERFALL DEVICE
Nobue Kawabata, 657 Bartlett Ave., Hayward, Calif.
Filed Sept. 4, 1959, Ser. No. 838,290
3 Claims. (Cl. 46—41)

This invention relates to waterfall operated devices for use in a garden and particularly to those of a pleasing and ornamental character.

It is an object of this invention to provide a garden waterfall operated device producing a series of pleasing musical tones for the enjoyment of persons in a garden, and moving in a pattern pleasing to the eye, the device being formed of parts having a natural and rustic appearance suitable to the environment of the garden, and being inexpensive and easy to manufacture.

The invention possesses other objects and features of advantage, some of which of the foregoing will be set forth in the following description of the preferred form of the invention which is illustrated in the drawing accompanying and forming part of this specification. It is to be understood however, that variations in the showing made by the said drawing description may be adopted within the scope of the invention as set forth in the claims.

Referring the the drawing:

FIGURE 1 is a perspective view of a garden waterfall device constructed in accordance with the present invention and mounted above the surface of a garden pool.

FIGURE 2 is a partially diagrammatic, cross-sectional, cut-away, elevation view on a reduced scale of the garden waterfall device shown in FIGURE 1.

The garden waterfall device of the present invention consists briefly of an arm 11 and pivotal mounting 12 therefor providing a normally overbalanced see-saw oscillation for the arm; tone sounding means 13 carired by the arm 11; a stationary abutment 14 (here shown as a rock or stone) positioned for audible striking of the tone sounding means 13 upon periodic oscillation of the arm 11; a water receptacle 16 carried by the arm and formed for filling in a relatively raised position (as illustrated in the drawing) and for emptying in a relatively lowered position, the receptacle supplying a counter-overbalancing moment, to rotate the arm 11, and water supply means 17 positioned for filling the receptacle 16 in its raised position.

An important feature of the ivention is that the arm 11 is pivoted at a point 18 intermediate the ends of the arm but not at the point of normal balance for the arm, so that the arm tends normally to rotate with the tone sounding means 13 going to its lowered position and downwardly striking the abutment rock 14 and with the water receptacle 16 going to its raised position as shown. The receptacle, when water filled for supplying its counter-overbalancing moment, raises the tone sounding means 13 and lowers the receptacle 16 sufficiently to tip and discharge the water. The tone sounding means 13 is thus dropped again to strike the abutment rock 14, and the receptacle 16 returns to its raised position for refilling, so that there is produced a periodic oscillation of the arm and a cyclical raising and dropping of the tone sounding means 13 for striking the abutment rock in a series of pleasing musical tone sounding impacts, and with a rythmical motion pleasing to the eye.

As here illustrated the tone sounding means 13 is hollowed to define an enclosed chamber 19 (FIGURE 2) for sounding a tone upon impact; and the water receptacle 16 is formed as a cavity 21 opening upwardly in the raised position and downwardly in the lowered position for the reception and discharge of the water, the cavity 21 having a size in relation to the weight of water and the positioning of the pivot point 18 on the arm, for holding enough water to apply the reversely overbalancing rotating moment to the tone arm. The provision of the tone sounding chamber 19 and the water cavity 21 is conveniently made, and the arm 11 is at the same time given an appearance suitable to the environment of the garden, by making the arm out of a multiple-chambered length of hollow partitioned bamboo. As here shown the length of bamboo is cut off at one end adjacent one of the partitions 22 of the bamboo, leaving the partition 22 and the next partition 23 defining the completely enclosed chamber 19 within the bamboo length; and the other end of the length of bamboo is cut off obliquely to leave the cavity 21 defined by the tubular sides of the piece and the next adjacent partition 24.

The water fall device is preferably combined with the garden pool 26 and is mounted above the surface of the pool, the mounting 12 for the arm here being a trunnion post driven into the bottom of the pool. The water supply means 17 may be of any suitable form, but as here illustrated includes a wooden post 27 having a projecting water spout 28 pointed into the mouth of the cavity 21 in the raised position of the cavity, and a communicating conduit 29 running down the interior of the post 27 to a pump 31 having an intake conduit 32 positioned to withdraw water from the pool. The pump 31 is here operated by an electric motor 33, supplied by a source of electricity at E. Thus arranged, the device of the invention forms a continuous flow re-circulating system withdrawing water from the pool and returning the water thereto by the oscillating cavity 21 of the tone arm 11.

I claim:

1. A garden waterfall device comprising, an abutment member; an oscillating tone arm formed of a mult'ple-chambered length of hollow partitioned bamboo providing an enclosed tone-sounding end chamber at a first end thereof; means mounting said tone arm for see-saw pivoting motion intermediate the ends thereof with said ends alternately assuming raised and lowered pos'tions and with said arm normally overbalanced for rotation of said first end to lowered position and downwardly striking said abutment member with a tone-sounding impact, the other end of said arm being obliquely cut off to define a cavity opening upwardly in the raised position and downwardly in the lowered position; said cavity having a size holding water to apply a reversely overbalancing rotating moment to said tone arm for rotation of said second end to lowered position for the discharge of water, and water supply means positioned for loading said cavity in the raised position, whereby said first end is cyclically raised and dropped for striking said abutment member in a series of pleasing musical tone sounding impacts.

2. A garden waterfall device as characterized in claim 1, in combination with a garden pool and wherein said abutment member and said tone arm are mounted above the surface of said pool, and said water supply means includes a pump having inlet means communicating with said pool and relatively elevated outlet means mounted for discharge into said cavity in its raised position and providing a continuous-flow recirculating system withdrawing water from the pool and returning the water thereto via the oscillating cavity of said tone arm.

3. A garden waterfall device comprising, an abutment member; an oscillating tone arm formed of a multiple-chambered length of hollow partitioned internal chambers providing an enclosed tone-sounding end chamber at a first end thereof; means mount'ng said tone arm for see-saw pivoting motion intermediate the ends thereof with said ends alternately assuming raised and lowered positions and with said arm normally overbalanced for rotation of said first end to lowered position and downwardly striking said abutment member with a tone-sounding impact, the other end of said arm being so formed that the internal chamber thereat defines a cavity opening upwardly in the raised position and downwardly in the lowered position; said cavity having a size holding sufficient water to apply a reversely overbalancing rotating moment to said tone arm for rotation of said second end to lowered position for the dicharge of water, and water supply means positioned for loading said cavity in the raised position, whereby said first end is cyclically raised and dropped for striking said abutment member in a series of pleasing musical tone sounding impacts.

References Cited in the file of this patent

UNITED STATES PATENTS

| | | |
|---|---|---|
| 488,537 | Bentley | Dec. 27, 1892 |
| 996,929 | Kempinski | July 4, 1911 |
| 1,429,684 | Muldner | Sept. 19, 1922 |
| 1,847,129 | Miller | Mar. 1, 1932 |
| 2,045,898 | Cullison | June 30, 1936 |
| 2,240,906 | Harold | May 6, 1941 |